(12) United States Patent
Schnitzer et al.

(10) Patent No.: US 8,689,659 B2
(45) Date of Patent: Apr. 8, 2014

(54) STEERING COLUMN FOR A MOTOR VEHICLE

(75) Inventors: Rony Schnitzer, Ruggell (LI); Simon Blättler, Haag (CH); Mathias Senn, Grabs (CH); Martin Rohr, Hard (AT); Hansjörg Sulser, Gamprin (LI)

(73) Assignee: Thyssenkrupp Presta Aktiengesellschaft, Eschen (LI)

( * ) Notice: Subject to any disclaimer, the term of this patent is extended or adjusted under 35 U.S.C. 154(b) by 0 days.

(21) Appl. No.: 13/201,691

(22) PCT Filed: Jan. 28, 2010

(86) PCT No.: PCT/AT2010/000029
§ 371 (c)(1),
(2), (4) Date: Aug. 16, 2011

(87) PCT Pub. No.: WO2010/094050
PCT Pub. Date: Aug. 26, 2010

(65) Prior Publication Data
US 2012/0024101 A1 Feb. 2, 2012

(30) Foreign Application Priority Data
Feb. 19, 2009 (DE) .......................... 10 2009 009 577

(51) Int. Cl.
*B62D 1/16* (2006.01)
(52) U.S. Cl.
USPC ............................................ 74/492; 280/777
(58) Field of Classification Search
USPC ............ 74/492, 493, 552, 494, 495; 188/371, 188/374; 280/775, 777
See application file for complete search history.

(56) References Cited

U.S. PATENT DOCUMENTS

| | | | | |
|---|---|---|---|---|
| 6,690,208 | B2 * | 2/2004 | Gloden et al. | 307/326 |
| 6,776,634 | B2 * | 8/2004 | Besier et al. | 439/164 |

(Continued)

FOREIGN PATENT DOCUMENTS

| | | |
|---|---|---|
| DE | 10 2005 056 308 | 3/2007 |
| DE | 102008016742 * | 3/2008 |

(Continued)

*Primary Examiner* — Troy Chambers
*Assistant Examiner* — Alexander Vu
(74) *Attorney, Agent, or Firm* — Wenderoth, Lind & Ponack, L.L.P.

(57) ABSTRACT

A steering column for a motor vehicle includes a first and a second part, which in the event of a vehicle crash can be displaced relative to each other in a displacement direction. At least one absorption element acts between the two parts for absorbing energy during the mutual displacement of the two parts, and at least one shift unit, which includes a shift component that can be shifted between a passive and an active shift position. The amount of the energy absorbed during the mutual displacement of the two parts differs in the passive and the active shift position of the shift component. During a displacement of the two parts in the event of a crash, a mutual energy-absorbing displacement takes place between the shift component being in the active shift position thereof and at least one section of the absorption element in an engagement region of the absorption element in which the shift element engages in the active shift position thereof, or between the shift component being in the active shift position thereof and one of the two parts that are mutually displaced in the event of a crash in an engagement region of said part in which the shift component engages in the active shift position thereof.

10 Claims, 6 Drawing Sheets

(56) References Cited

U.S. PATENT DOCUMENTS

| | | |
|---|---|---|
| 7,188,867 B2* | 3/2007 | Gatti et al. ............... 280/777 |
| 7,661,711 B2* | 2/2010 | Menjak et al. ............ 280/777 |
| 7,963,561 B2* | 6/2011 | Waibel et al. ............. 280/777 |
| 2001/0017463 A1* | 8/2001 | Philippe et al. ........... 280/779 |
| 2003/0042723 A1 | 3/2003 | Riefe |
| 2004/0232685 A1 | 11/2004 | Gatti et al. |
| 2005/0217407 A1* | 10/2005 | Yamamura .................. 74/492 |
| 2006/0214411 A1* | 9/2006 | Ikegaya et al. ............ 280/777 |
| 2006/0273568 A1* | 12/2006 | Manwaring et al. ....... 280/777 |
| 2007/0228717 A1* | 10/2007 | Tanai ........................ 280/777 |
| 2008/0100050 A1* | 5/2008 | Menjak et al. ............ 280/777 |
| 2008/0229867 A1 | 9/2008 | Waibel et al. |
| 2008/0257097 A1 | 10/2008 | Graf |
| 2010/0018340 A1* | 1/2010 | Schnitzer et al. ........... 74/493 |
| 2010/0282016 A1* | 11/2010 | Oehri et al. ................. 74/493 |
| 2012/0024101 A1* | 2/2012 | Schnitzer et al. ........... 74/492 |

FOREIGN PATENT DOCUMENTS

| | | |
|---|---|---|
| DE | 20 2008 015 444 | 2/2009 |
| DE | 10 2008 016 742 | 11/2009 |
| EP | 1 288 103 | 3/2003 |
| EP | 1 187 752 | 9/2004 |
| EP | 1 707 471 | 10/2006 |
| EP | 1 839 994 | 10/2007 |
| EP | 1 479 593 | 2/2008 |
| EP | 1 916 175 | 4/2008 |
| WO | 2006/042604 | 4/2006 |
| WO | 2007/048153 | 3/2007 |
| WO | 2008/142312 | 11/2008 |
| WO | 2009/147325 | 12/2009 |

* cited by examiner

STEERING COLUMN FOR A MOTOR VEHICLE

BACKGROUND OF THE INVENTION

The invention relates to a steering column for a motor vehicle comprising a first and a second part, which, in the event of a vehicle crash, are dislocatable relative to one another in a displacement direction. At least one absorption element acts between these two parts for the absorption of energy during the displacement with respect to each other of the two parts, and at least one switching unit includes a switching piece switchable between a passive and an active switched position. The extensiveness of the energy absorbed during the displacement with respect to each other of the two parts differs in the passive and in the active switched position of the switching piece.

Steering columns for motor vehicles conventionally comprise a jacket unit (also referred to as "jacket tube") by which is rotatably bearing supported the section of the steering spindle adjoining at the steering wheel end. Current developments of steering columns are most commonly adjustable in order to make possible adjusting the position of the steering wheel to the seating position of the driver. These steering columns are frequently length- as well as height- or inclination-adjustable. There are, in addition, also steering columns that are adjustable only in the longitudinal direction or only in the direction of height or inclination. The steering column can be adjusted in the opened state of a clamping mechanism and in the closed state of the clamping mechanism the set position of the steering column is secured in position. For setting the steering column in the opened state of the clamping mechanism, the jacket unit is appropriately displaced relative to a support unit via which the steering column can be connected with the chassis of the motor vehicle. For the length adjustment of the steering column, the steering spindle comprises telescopable sections and for the height or inclination adjustment of the steering column, it comprises sections that can be swiveled relative to one another.

In the event of a vehicle crash, the steering column is said to be shifted based on the corresponding energy absorption. It is known to provide for this purpose two parts dislocatable relative to one another in a displacement direction, wherein the displacement direction extends in general parallel to the direction of the length adjustment of the steering column, thus parallel to the section of the steering spindle adjoining at the steering wheel end. Between the two parts, dislocatable relative to one another in the event of a crash, acts at least one energy absorption element in order to attain a predetermined energy absorption.

The two parts dislocatable relative to one another in the event of a crash can be, for example, the support unit, which forms a type of carriage, and a chassis unit rigidly affixed on the vehicle chassis relative to which the carriage is displaceably supported. Such a formation is disclosed, for example, in WO 2006/042604.

On the other hand, in the device disclosed in WO 2007/048153 the two parts dislocatable relative to one another in the event of a crash are formed by the jacket unit, rotatably supporting the steering spindle, and the support unit. In the closed state of a clamping mechanism, toothed arresting elements are in engagement with one another, of which the one arresting element is connected with the support unit such that it is nondisplaceable relative to the longitudinal direction of the steering column, and of which the other arresting element is connected across an energy absorption element with the jacket unit. During normal operation, this connection with the jacket unit is also nondisplaceable. In the event of a crash, the arresting element can be dislocated in the longitudinal direction of the jacket unit with the absorption of energy. In the case of this steering column, further embodiment examples are described, in which the connection of one or several arresting elements with the support unit takes place across a pyrotechnical switching unit. By this unit, the arresting element can be raised from the arresting element connected with the jacket unit via the energy absorption element in order to change the energy absorption characteristic in the event of a crash.

A change of the extent of the energy absorption in the dislocation with respect to each other of the two parts of the steering column in the event of a crash can be desired as a function of several different parameters, for example as a function of the weight of the driver or as a function of whether or not the driver is buckled in.

In the steering column disclosed in EP 1 479 593 B1 between two parts, dislocatable relative to one another in the event of a crash, absorption elements can be disposed which are formed by sheet metal strips that are curved in the shape of a U. At one end these sheet metal strips are all secured on the support unit bearing the jacket tube and the steering spindle. On the other end, at least one of these sheet metal strips is fastened on a chassis unit to be secured in place on the vehicle chassis. For at least one further curved sheet metal strip, the connection with the chassis unit takes place across a pyrotechnical switching unit ("pyroswitch"). The switching unit is secured on the chassis unit and the connection of the absorption element with the chassis unit is carried out across a pin-shaped switching piece of the switching unit, which, in an active switched position, engages into a loop of the absorption element and, in a passive switched position, is pulled out of the loop whereby the connection of this absorption element with the chassis unit is opened. The energy absorption during the displacement with respect to each other of the two parts can thereby be switched over between a higher level and a lower level. A similar, controllable energy absorption arrangement is also disclosed in EP 1 707 471 A1. The absorption elements are here developed as tear strips. For at least one tear strip, the connection with a vehicle body-stationary securement part can be opened and closed through a pyroswitch in order to affect the absorption characteristic.

A further steering column with absorption characteristic variable in the event of a crash is disclosed in EP 1 187 752 B1. Between the two parts of the steering column, becoming dislocated in the event of a crash, function U-shaped curved holding strips acting as energy absorption elements. At least one bolt for the connection of the absorption element with one of the two parts can be made ineffective through a pyrotechnical element in order to vary the absorption characteristic.

SUMMARY OF THE INVENTION

The invention addresses the problem of providing a simply implemented and advantageous steering column of the type described in the introduction, in which the extensiveness of the energy absorption during the dislocation in the event of a crash of the two parts of the steering column can be varied by a switching unit. According to the invention this is attained through a steering column with the features of the present invention.

In a steering column according to the invention, a first embodiment variant provides that, when the switching piece is in its active switched position, in the case of a shifting with respect to each other of the two parts of the steering column in the event of a crash, a displacement with respect to each other under the absorption of energy between the switching piece and the absorption element occurs in an engagement region of the absorption element, into which region the switching piece engages in its active switched position. In a second embodiment variant, when the switching piece is in its active switched position, in the case of a shifting with respect to each other of the two parts of the steering column in the event of a crash, a dislocation (relative to one another) under the absorption of energy between the switching piece and one of the two parts becoming dislocated in the event of a crash occurs in an engagement region of this part into which region the switching piece engages in its active switched position.

In contrast to prior art in which the switching unit is employed only for coupling or decoupling an absorption element, in the invention the switching piece forms an active part of the energy absorption mechanism when it is located in its active position so that it becomes displaced under energy dissipation relative to the absorption element or a section of the absorption element or that part of the steering column with which it cooperates. Thereby, a simple and effective implementation can be attained. For example, an absorption element, provided in any event between the two parts becoming dislocated relative to one another in the event of a crash, can be utilized for the purpose of effecting in the active switched position of the switching piece additional energy absorption between the switching piece and the absorption element. Thereby, in very simple manner two different energy absorption levels can be determined; a lower one in the case in which the switching piece is not in engagement with the counter piece under dissipation of energy, and a higher one in the case that the switching piece is in engagement with the counter piece with the dissipation of energy.

In an advantageous embodiment of the invention, the switching unit or a housing of the switching unit is secured in position on the absorption element itself. Thereby pre-assembly and, optionally, a function test can be carried out before the installation into the steering column whereby facilitation of the assembly results and a very high reliability can be attained.

A favorable embodiment provides that during the dislocation with respect to each other of the two parts of the steering column in the event of a crash, a first section of the absorption element is held nondisplaceably on the first of the two parts and a second section of the absorption element is held nondisplaceably on the second of the two parts. The first and second section of the absorption element can be a first and a second leg of the absorption element, which are connected with one another via a recurvature of the absorption element, wherein overall is developed a U-shaped curved strip.

Consequently, the absorption element can be developed in a conventional manner as a "bending latch" or as a "tearing-bending latch", e.g. during the displacement with respect to each other of the two parts bending work on the absorption element occurs or, under coupling, tearing or bending work occurs on the absorption element.

In its active switched position the switching piece of the switching unit preferably engages into the first section of the absorption element, which is held nondisplaceably on the first of the two parts, and the switching unit is secured on the second section of the absorption element, which is nondisplaceably held on the second of the two parts.

The engagement of the switching piece into the engagement region of the absorption element or of that part of the steering column with which it cooperates, according to a feasible embodiment, can be such that the switching piece engages into an opening provided in the engagement region, which it at least regionally widens in the dislocation in the event of a crash with respect to each other of the two parts. This opening can consequently be an elongated hole extending parallel to the displacement direction of the two parts, which elongated hole in the starting position (when a crash has not occurred) includes a region with greater width through which the switching piece extends, and a region with lesser width which, in the event of a crash, is widened during a dislocation of the switching piece into it.

According to a further feasible embodiment, the switching piece during the dislocation with respect to each other of the two parts in the event of a crash can further tear open (in the displacement direction) an opening into which it projects. A combination of the widening with the tearing of an opening can also be provided, for example.

In further development of the invention, for the improvement of the tearing-open on the switching piece a corresponding blade can be provided. Alternatively, it is also conceivable and feasible to provide the energy absorption by crushing of a portion of the switching piece with the surface of the engagement region. However, in this solution the force path is not so exactly settable, such that this variant should be less preferred.

In a preferred embodiment is provided that the two parts, which in the event of a crash are dislocatable relative to one another, are a jacket unit which rotatably supports the section of the steering spindle adjoining the steering wheel-side end of the steering spindle, and a support unit securable on the vehicle chassis, by which the jacket unit is supported. The steering column is herein preferably at least length adjustable, wherein a clamping mechanism is provided in the opened state of which the jacket unit is displaceable relative to the support unit in the longitudinal direction of the steering column and, in the closed state of which, the set position of the jacket unit is secured in position relative to the support unit in normal operation (thus without a crash having occurred). In the event of a crash, the jacket unit can become dislocated relative to the support unit in the longitudinal direction of the steering column, wherein, by means of at least one absorption element disposed between the support unit and the jacket unit, energy is absorbed. By overcoming the holding force exerted by securement elements of the clamping mechanism, which act between the support unit and the jacket unit, additional energy absorption can occur.

For example, the limit value of the force acting onto the jacket unit above which a displacement of the jacket unit relative to the support unit occurs, can be less than 10,000 N. This limit value is preferably greater than 500 N.

It is advantageously provided that the clamping mechanism comprises a clamp bolt which penetrates through openings in side jaws of the support unit between which the jacket unit is disposed and which is turned about its axis during the opening and closing of the clamping mechanism. Herein, furthermore, at least one holding part is disposed between the side jaws of the support unit at or on the clamp bolt. Through the turning of the clamp bolt during the opening and closing of the clamping mechanism, the holding part is displaced and, in the closed state of the clamping mechanism, the holding part engages on the section of the absorption element in order to hold this second section of the absorption element, during the displacement of the jacket unit in the event of a crash, nondisplaceably relative to the support unit. In this second section of the absorption element, several slots or projections are advantageously provided spaced apart in the longitudinal direction, into which, when the clamping mechanism is closed, the holding part engages or snaps, for example with a projection (or a nose), or with onsetting displacement of the jacket unit relative to the support unit, such that the displacement between the second section of the absorption element and of the support unit is prevented immediately or after a short predefined maximal displacement path. The clamp bolt can herein be retained by the margins of the openings penetrated by it in the side jaws of the support unit such that it is nondisplaceable with reference to the longitudinal direction of the steering column.

Through this advantageous further development of the invention, the course of the energy absorption over the displacement path will be independent of the set position of the jacket unit relative to the support unit, apart from the short predefined maximally possible displacement path up to the snapping-in of the holding part into the second section of the absorption element. This means that for the particular switched position of the switching piece in each case one predefined force course over the displacement of the jacket unit relative to the support unit is realizable with the solution according to the invention.

BRIEF DESCRIPTION OF THE DRAWINGS

Further advantages and details of the invention will be explained in the following in conjunction with the enclosed drawings, in which.

DETAILED DESCRIPTION OF THE INVENTION

An embodiment of a steering column according to the invention is depicted in FIGS. 1 to 7.

Figure 1:
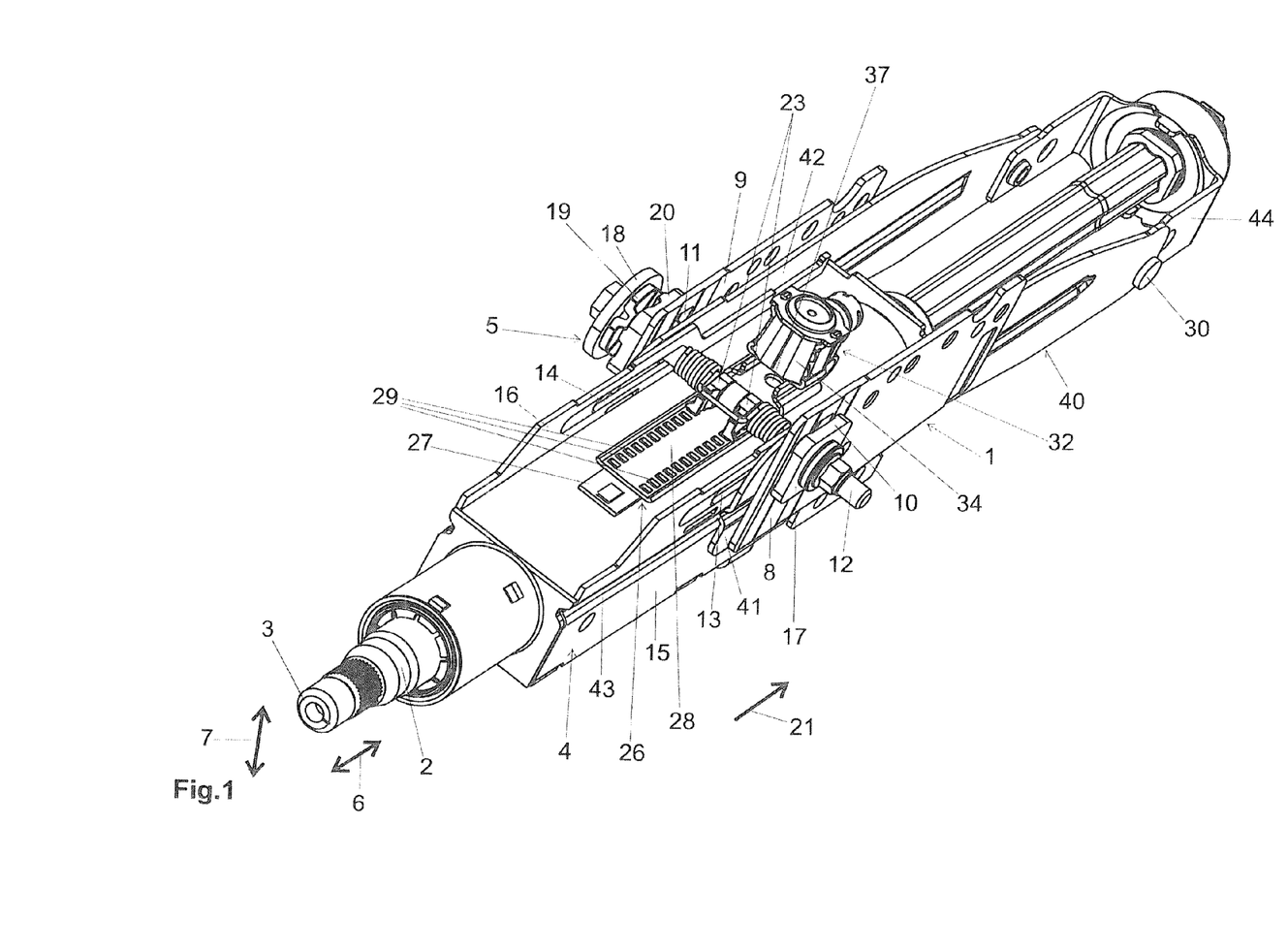
FIG. 1 and FIG. 2 are oblique views of an embodiment of a steering column according to the invention from different lines of sight.
Figure 2:
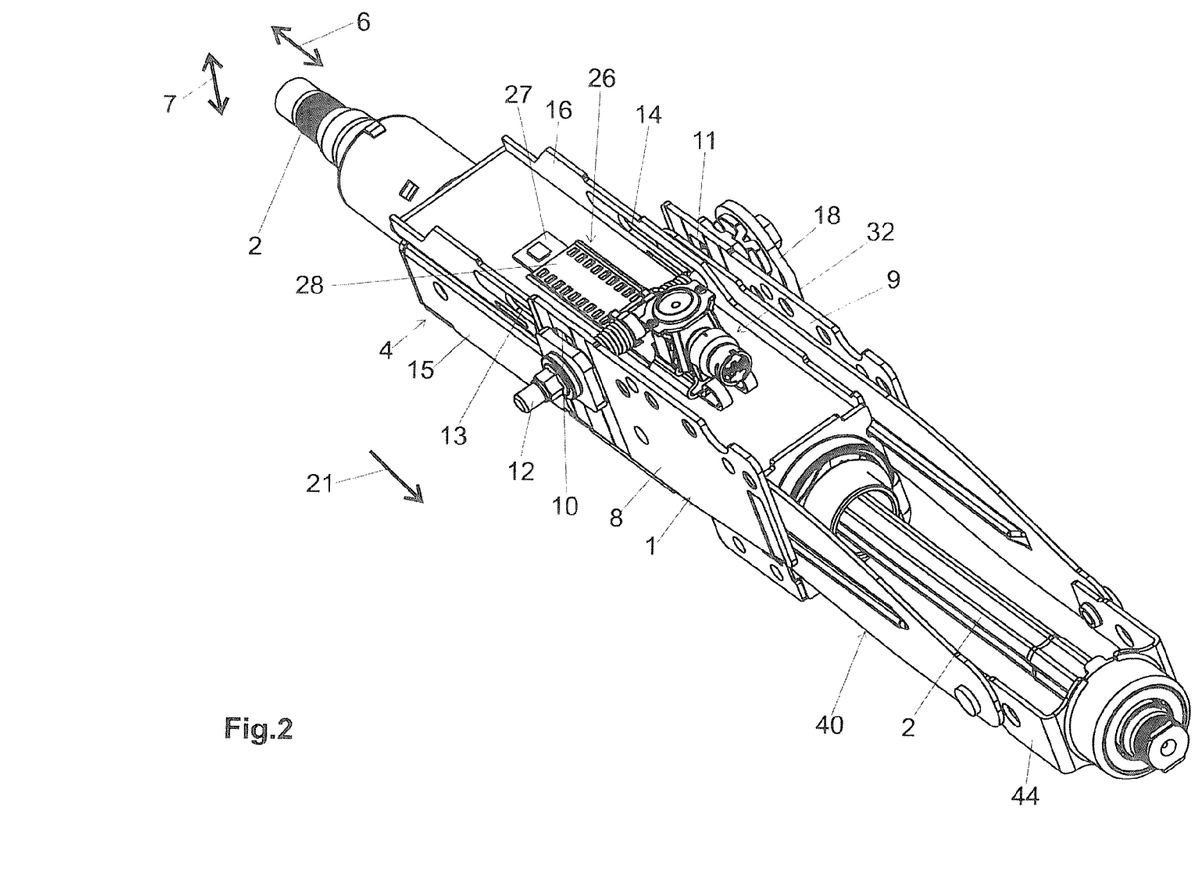

The steering column comprises a jacket unit 4 which rotatably bearing supports a section of the steering spindle 2 adjoining a steering wheel-side end 3. The jacket unit 4 is supported by a support unit 1 which can be secured on the chassis of a motor vehicle. The support unit 1 comprises side jaws 8, 9 disposed on both sides of the jacket unit 4, which side jaws 8, 9 can be connected with one another above or below the jacket unit 4 through a connection limb (not shown in the Figures).

In the opened state of a clamping mechanism 5, the steering column can be adjusted in its longitudinal direction 6 (=axial direction of the section of the steering spindle 2 rotatably supported by the jacket unit 4) and in the direction 7 of height or inclination. The jacket unit 4 is herein displaceable relative to the support unit 1 in the longitudinal direction 6 and in the direction 7 of the height or inclination adjustment.

Figure 3:
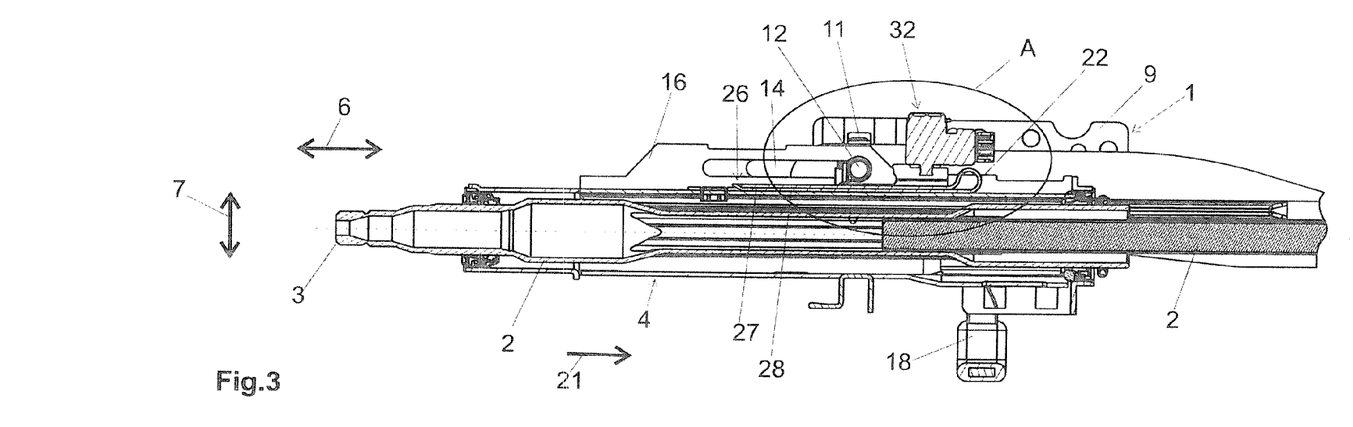
FIG. 3 shows a longitudinal center section of the steering column.
Figure 4:
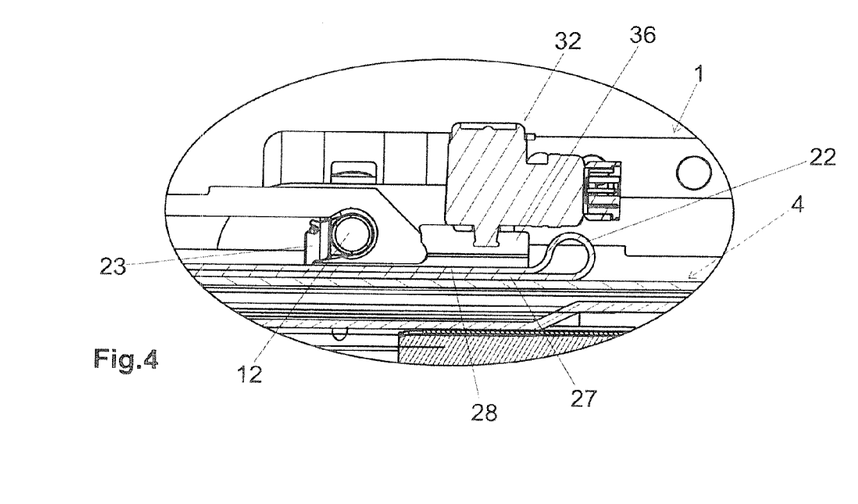
FIG. 4 shows an enlarged detail A from FIG. 3.
Figure 5:
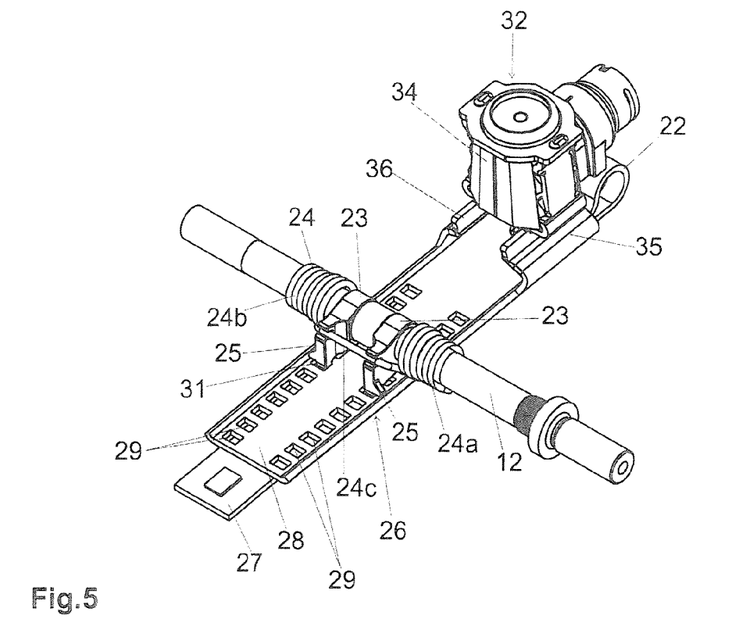
FIG. 5 is an oblique view of the holding part disposed on the clamp bolt together with the absorption element and the pyrotechnical switching unit secured thereon.

To permit the length adjustment of the steering column, the steering spindle 2 includes sections which are telescopable relative to one another (evident in FIG. 3).

The clamping mechanism 5 comprises a clamp bolt 12 which extends transversely, in particular at right angles, to the axial direction of the section of the steering spindle 2 supported by the jacket unit 4 and penetrates openings 10, 11 in the side jaws 8, 9 of the support unit 1 as well as openings 13, 14 in the side jaws 15, 16 of the jacket unit 4. The openings 10, 11 in side jaws 8, 9 of the support unit 1 are realized in the form of elongated holes which extend in direction 7 of the height or inclination adjustment. The openings 13, 14 in side jaws 15, 16 of jacket unit 4 are realized in the form of elongated holes which extend in the longitudinal direction 6.

The clamp bolt 12 is held by the margins of the openings 10, 11 in side jaws 8, 9 of support unit 1 penetrated by it in a particular set height or inclination position of the steering column such that it is nondisplaceable in the longitudinal direction 6 of the steering column.

In the depicted embodiment, an intermediate unit 40 is disposed between the support unit 1 and the jacket unit 4. This intermediate unit 40 includes side jaws 41, 42 which are disposed between the particular side jaw 8, 9 of support unit 1 and jacket unit 4. The clamp bolt 12 penetrates round holes in the side jaws 41, 42. The intermediate unit is swivellable relative to the support unit 1 about a swivel axle 30 in the direction 7 of height or inclination adjustment. The swivellability about the swivel axle 30 takes place relative to a holding yoke 44 disposed on the steering spindle 2 rotatably relative thereto. Instead of a separate holding yoke 44, extended sections of side jaws 8, 9 can also be provided. In the longitudinal direction 6 of the steering column, the side jaws 41, 42 of intermediate unit 40 are guided relative to jacket unit 4 through projecting webs which engage into longitudinal grooves 43 on the side faces of jacket unit 4.

In the closed state of the clamping mechanism 5, the side jaws 8, 9 of support unit 1 are braced on both sides against the side jaws 41, 42 of the intermediate unit 40 and this unit is braced against the jacket unit 4 wherein the cooperating friction faces represent arresting elements acting under frictional closure of the clamping mechanism 5. Press-on parts 17 disposed on the clamp bolt and pressed against the outsides of the side jaws 8, 9 form further friction faces cooperating with the side jaws 8, 9, whereby further arresting elements of the clamping mechanism 5 acting under frictional closure are formed. Conceivable and feasible in principle would be developing further friction faces through cooperating lamellae or, alternatively, also develop arresting element through toothings acting under form closure, as is known.

To open and close the clamping mechanism 5 serves an actuating lever 18 through the swiveling of which in a known manner a cam disk 20 cooperating with a counter disk 19 (=wedge plate) is turned, wherein during the closing of the clamping mechanism 5 the two disks 19, 20 are spread apart.

The arresting elements of the clamping mechanism 5 are consequently brought into engagement with one another through the axial displacement of the clamp bolt 12 or through the axial displacement relative to the clamp bolt 12.

Instead of an actuating lever 18, another actuation, for example electrical actuation, of the clamping mechanism 5 could also be provided. Instead of a wedge plate or cam disk 20, another mechanism for the axial displacement of the clamp bolt 12 or for the axial displacement of arresting elements relative to the clamp bolt 12 could also be provided, for example systems with rolling bodies which run in cam tracks.

Through a torsion-tight connection of the actuating lever 18 with the clamp bolt 12, this bolt is turned about its axis during the opening and closing of the clamping mechanism 5.

On the clamp bolt 12 are disposed holding parts 23. These are located in the region between the side jaws 8, 9 of support unit 1. The holding parts 23 are disposed on the clamp bolt 12 swivellable relative to the clamp bolt about the axis of the bolt, advantageously thereby that, as depicted, the clamp bolt 12 penetrates an opening in the particular holding part 23. The two holding parts 23 shown in the depiction can also be realized as a unitary holding part.

On the clamp bolt 12 is further disposed a spring element 24. It comprises on both sides of the holding parts 23 sections 24a, 24b, encompassing the clamp bolt 12 in the manner of a helical spring, and a bow section 24c connecting them, wherein the sections 24a, 24b, 24c are comprised of a continuous spring wire. The sections 24a, 24b are connected with the clamp bolt 12 such that they are nonturnable from position, for example by clamping, by form closure or by material closure, for example by adhesion or spot welding. The bow section 24c extends through a groove 25 in the particular holding part 23.

The holding parts 23 are thereby held without external force acting on them, in a certain angular position relative to the clamp bolt 12 and are deflectable from this angular position against the reset force of the spring element 24.

As will be explained more precisely later, the support unit 1 and the jacket unit 4 form first and second parts of the steering column which, in the event of a vehicle crash, are dislocatable relative to one another in the displacement direction 21 under energy absorption. The displacement direction 21 extends parallel to the longitudinal direction 6 or to the axial direction of the section of steering spindle 2 supported by the jacket unit 4.

During their dislocation with respect to each other in the event of a crash, between jacket unit 4 and support unit 1 acts an absorption element 26 through which during the displacement with respect to each other of these two parts energy is consumed.

A first section 27 of absorption element 26 is held on the jacket unit 4 such that it is nondisplaceable at least with reference to the displacement direction 21. For example, the first section 27 can be connected by riveting with jacket unit 4, it can be connected by being welded to it, through a securement clip or it can also be implemented unitarily with it (the absorption element could, for example, be formed by a punched-out, curved tang). During the dislocation with respect to each other between the support unit 1 and the jacket unit 4 in the event of a crash, a second section 28 of the absorption element 26 is held such that it is nondisplaceable relative to the support unit 1 in reference to the displacement direction 21. In the depicted embodiment, the first and second sections 27, 28 are formed by first and second legs which are connected with one another via a recurvature 22 (=a curved-over section). Overall, a substantially U-shaped development is obtained, wherein the first and the second leg extend parallel to one another and their broad sides are located one above the other, preferably in contact with one another. The two legs of the absorption element 26 extend in the longitudinal direction 6 or the displacement direction 21.

For the nondislocatable retention, in the event of a crash, of the second section 28 relative to the support unit 1 serve two rows of engagement elements 29, sequentially disposed in the longitudinal direction 6 of the steering column at particular spacings, which are developed in the second section 28 and with which the holding parts 23 cooperate in the closed state of the clamping mechanism 5. In the depicted embodiment, these engagement elements 29 are formed by slot-like cutouts, continuous through the material of the absorption element 26, into which a projecting nose 31 of the particular holding part 23 can be introduced. The cutouts could also be implemented, for example, in the form of groove-like indentations or simply as punched-out holes.

In the opened state of the clamping mechanism 5, the holding part 23 is raised from the second section 28 of the absorption element 26. Through the turning of the clamp bolt 12 when the clamping mechanism 5 is closed, the holding parts 23 are pressed onto the second section 28 of the absorption element 26 under pre-load of the spring element 24. Two cases can occur herein. On the one hand, the position with respect to each other between each holding part 23 and absorption element 26 (due to the instantaneously set position of the steering column in the longitudinal direction) can just be such that the holding part 23 engages into one of the engagement elements 29 such that a form-closure engagement between the holding part 23 and the second section 28 of the absorption element 26 is developed immediately. On the other hand, the nose 31 can come to lie on a web between two successive engagement elements 29. In this case, the holding part 23 is pressed through the spring force of spring element 24 onto the second section 28 of the absorption element 26. If, in the last described position of the holding part 23 a vehicle crash occurs through which the holding force, exerted by the arresting elements of the clamping mechanism 5, of the jacket unit 4 relative to the support unit 1, is exceeded, a shift of the jacket unit 4 relative to the support unit 1 would commence until the nose 31 moves into the region above an engagement element 29, whereupon through the spring force of the spring element 24 the nose is brought into engagement with the engagement element 29.

Consequently, in the event of a crash, a form-closure engagement of the holding part 23 with the second section 28 of the absorption element 26 occurs either immediately after the closing of the clamping mechanism 5 or at least after an initially minimal displacement of the jacket unit 4 relative to the support unit 1 which is less than the distance of two successive engagement elements 29. During the dislocation of the jacket unit 4 relative to the support unit 1 in the event of a crash, subsequently the second section 28 of the absorption element 26 is held nondisplaceably relative to the support unit 1.

Figure 6:
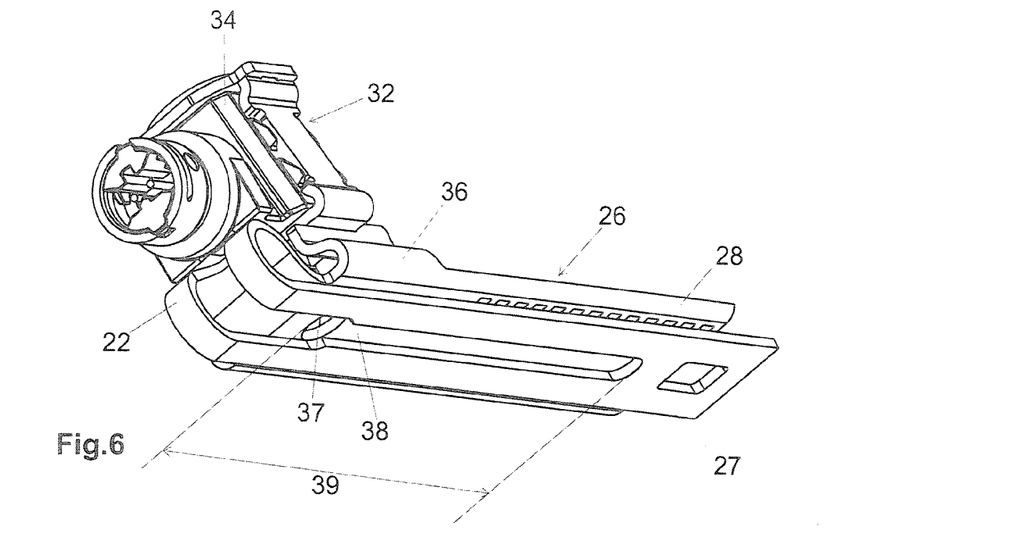
FIG. 6 shows the parts of FIG. 5 in an oblique view from obliquely below in the passive switched position of the switching piece of the switching unit.
Figure 7:
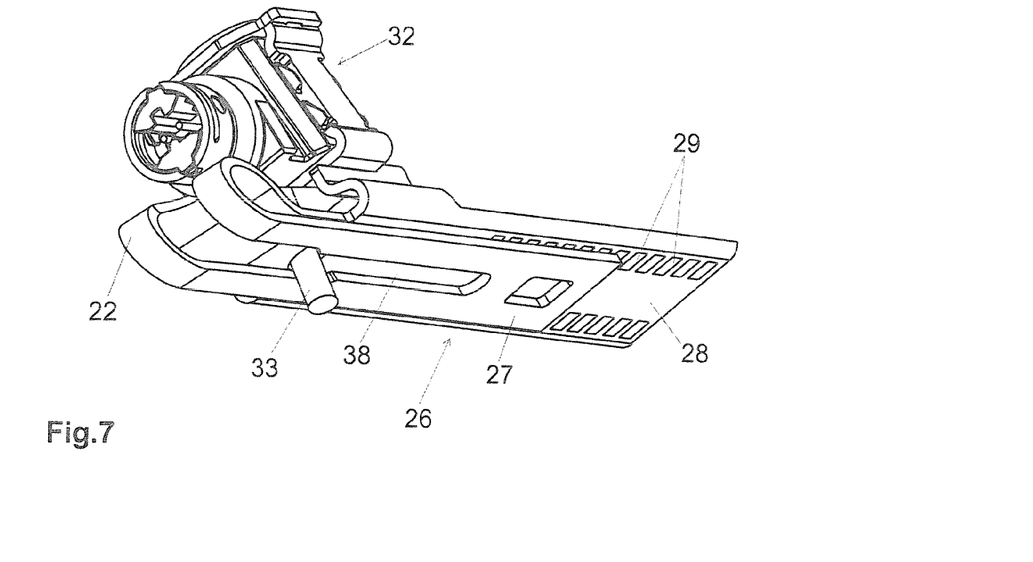
FIG. 7 is a depiction corresponding to FIG. 6 in the active switched position of the switching piece, after a vehicle crash.

If, in the event of a vehicle crash, through the secondary collision of the driver, the forces exerted onto the jacket unit 4 in the direction toward the vehicle front are sufficiently high, a dislocation of the jacket unit 4 relative to the support unit 1 occurs in the displacement direction 21 (=in the longitudinal direction 6 of the steering column). Herein, the holding forces exerted by the arresting elements of the clamping mechanism 5, which hold the jacket unit 4 relative to the support unit 1, are exceeded. Furthermore, energy is absorbed by the absorption element 26. The first section 27 is entrained with the jacket unit 4 by the latter, and the second section 28 is fixedly held in place relative to the support unit 1. In the depicted implementation of the absorption element 26 in the form of a bending strip, bending work is herein executed on the bending strip, wherein the site of the recurvature 22 is displaced along the bending strip (FIG. 7 in comparison to FIG. 6).

Instead of a pure bending strip, the absorption element 26 could, for example, also be realized as a combined tearing and bending strip. For this purpose, the first section 27 could comprise a base plate connected with the jacket unit 4, from which during the displacement of the jacket unit 4 relative to the support unit 1 a strip could be torn. In order to predetermine the margins of the tear-out strip, appropriate weakened lines could be provided in the base plate.

In order to be able to affect the energy absorption effected through the absorption element 26, a switching unit 32 is provided, which, in the depicted embodiment is formed by a pyrotechnical switch ("pyroswitch"). The switching unit 32 comprises a pin-shaped switching piece 33 displaceable between a passive switched position (FIG. 6) and an active switched position (FIG. 7). In its passive switched position the switching piece 33 is refracted, in its active switched position it is projected out.

The housing 34 of the switching unit 32 is secured on the second section 28 of the absorption element 26, specifically between the region in which the engagement elements 29 are located and the recurvature 22. To secure the switching unit 32, for example, securement flanges 35, 36 formed by the side margins of the leg forming the second section 28 could be provided, with which the housing 33 is connected, for example, by spot welding.

In its active switched position, the pin-shaped switching piece 33 projects through an opening 37 in the second section 28 into an opening 38 in the first section 27. The opening 38 in the first section 27 is realized as an elongated hole extending in the displacement direction 21. In the starting position (if a vehicle crash has not yet occurred) the switching piece 33 projects in its active switched position through a region of opening 38, whose width is sufficiently large such that the switching piece 33 can enter through it. Adjoining this region of opening 38 with greater width is a region of opening 38 with a width which is less than the diameter of the switching piece 33. In the event of a crash, the switching piece 33 is shifted into this region with the lesser width with the widening of the opening 38 in this region, wherein energy is absorbed in a corresponding manner. FIG. 7 shows a possible state after a vehicle crash, wherein the switching piece 33 has widened the opening 38 over a section of its length with the lesser width. The region over which the switching piece 33 can come to lie in the starting position (without a vehicle crash) and in the course of a vehicle crash, is referred to as engagement region 39 (FIG. 6).

The width of the opening can vary over its length such that a defined force course is settable through the shaping of the opening.

Instead of a widening of an opening 38 by the switching piece 33, also an enlargement of an opening by tearing open the material of the absorption element 26, for example, can also be provided. The opening extends in this case not over the entire length of the engagement region 39. In the region to be torn open an appropriate weakening can be developed in the material of the absorption element 26, for example through a groove decreasing the thickness of the wall or though a stamping extending through a portion of the wall thickness. A combination of widening and tearing-open can also be provided; for example, over a first section of the displacement of the switching piece 33 in the engagement region 39, a widening of the opening 38 can be provided, and in a second section adjoining thereon an enlargement of the opening 38 by tearing open the material of the absorption element 26 can be provided. Other energy-consuming absorption mechanisms can also be provided, for example abrading or shaving of the switching piece 33 over the surface of the first section 27.

The opening 37 in the second section 28 is preferably developed in the form of a round hole. During the energy-consuming displacement of the switching piece 33 along the engagement region 39 of the second section 28, the switching piece 33 is herein stayed by the margin of the opening 38.

The extensiveness of the energy absorption during the dislocation of the jacket unit 4 relative to the support unit 1 in the event of a vehicle crash can, consequently, be varied by means of the switching unit 32. If the switching piece 33 is in its active switched position, the force required for the displacement of the jacket unit 4 relative to the support unit 1, due to the herein absorbed energy between the switching piece 33 and the absorption element 26, is higher than in the passive switched position of the switching piece 33, if this piece is not in engagement with the first section 27 of the absorption element 26.

Figure 8:
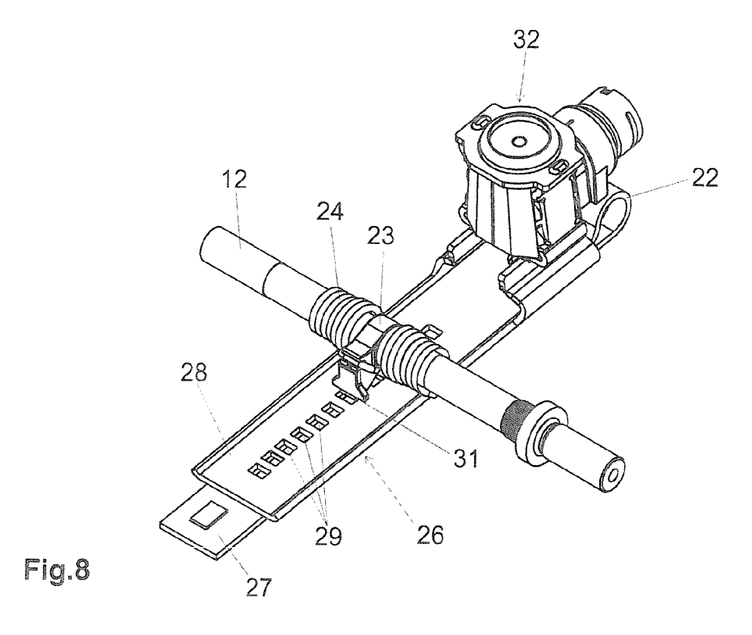
FIG. 8 is an oblique view analogous to FIG. 5 of a modified embodiment.

Various modifications of the embodiment depicted in FIGS. 1 to 7 are conceivable and feasible without exceeding the scope of the invention. For example, FIG. 8 shows an embodiment variant in which in the second section 28 of the absorption element 26 only a single row of engagement elements 29 extending in the longitudinal direction is provided with which a holding part 23 cooperates. More than two rows of engagement elements 29 could also be provided in another embodiment variant.

Figure 9:
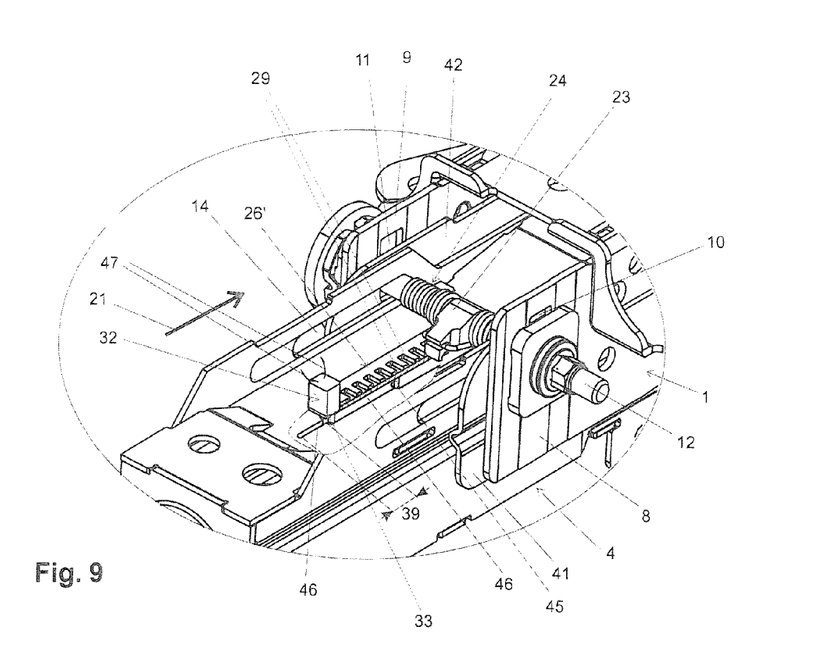
FIG. 9 is a portion of an oblique view of a steering column according to a further embodiment of the invention.

FIG. 9 shows a further feasible embodiment. The absorption element 26' here comprises a plate which is provided with a row of engagement elements 29 in order to cooperate with the holding part 23. During the dislocation of the jacket unit 4 relative to the support unit 1 in the event of a crash, the absorption element 26' is held by the holding part 23 such that it is nondisplaceable relative to the support unit 1 (at least after an initial minimal displacement until the holding part 23 has come into engagement with an engagement element 29). The absorption element 26' further includes a bolt or pin 45 affixed on the underside of the plate, which bolt 45 engages into an elongated hole 46 which is developed in the jacket unit 4. The hole width of the elongated hole 46 is regionally narrower than the outer diameter of bolt 45 and if, in the event of a crash, a dislocation of the jacket unit 4 relative to the support unit 1 occurs, the elongated hole 46 is widened by bolt 45 with the absorption of energy.

On the absorption element 26', the housing 34 of a switching unit 32 is secured. The switching unit 32 is controlled with the electric connection terminal 47. The switching piece 33 of switching unit 32 in its active switched position projects through an opening in the absorption element 26' into the elongated hole 46 and specifically in a region of the elongated hole 46 which has a lesser width compared to the region through which bolt 45 projects in the basic position (without a vehicle crash having occurred). Adjoining this region with lesser width is a region with an even lesser width of the elongated hole 46. In the event of a vehicle crash, the switching piece 33 can also shift into this last-mentioned region with the widening of the width of the elongated hole 46, wherein energy absorption occurs. The region, over which the switching piece 33 can cooperate with the jacket unit in the basic position and in the case of a vehicle crash, is again referred to as engagement region 39.

Figure 10:
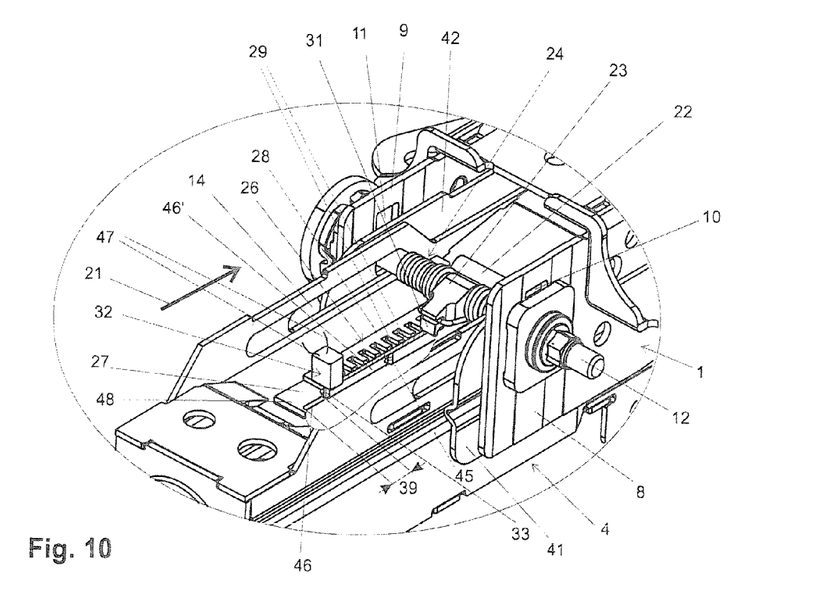
FIG. 10 is a portion of an oblique view of a steering column according to a further embodiment of the invention.

The embodiment according to FIG. 10 differs from the embodiment such as is illustrated in FIG. 9 thereby that the switching piece 33 of the switching unit 32 engages into an elongated hole 46 of the first section 27 of absorption element 26 secured on the jacket unit 4. During the dislocation of the jacket unit 4 in the event of a crash, the first section 27 with the jacket unit 4 is displaced relative to the support unit 1. The second section 28 is connected via the nose 31 of the holding part 23 with the support unit such that it is nondisplaceable. During the displacement of the two sections 27, 28 of absorption element 26 relative to one another, the recurvature 22 is deformed and the switching piece 33 deforms the engagement region 39 of the elongated hole 46 such that energy is dissipated.

The first section 27 of the absorption element can be welded to the jacket unit 4 with a welding seam 48, it can be riveted to it or be connected in another manner. It is also conceivable and feasible to complete the connection via a pin or bolt 45 pressed into an elongated hole 46' and which under deformation of the elongated hole 46' becomes dislocated in the event of a crash in the longitudinal direction and absorbs additional energy. In this way the possible displacement path over which an energy consumption can take place, can be extended or also a further energy level for the absorption can be presented. It can, for example, be arranged to provide in a first step the deformation of the recurvature 22, in a second step the widening of the engagement region 39 of the elongated hole 46 through the switching piece 33 of the switching unit 32, and in a third step the widening of the elongated hole 46' through the securement bolt 45. Through the capability of removing the switching piece 33 of the switching unit 32 out of the engagement region (=passive switched position), the second step of the absorption can be skipped.

When the switching piece 33 is in its active switched position in the event of a crash during a dislocation of the jacket unit 4 relative to the support unit 1, consequently, a greater energy absorption occurs than in the case of the passive switched position of the switching piece 33 in which it is retracted out of the elongated hole 46.

It would in principle also be conceivable and feasible to provide an absorption element which in the event of a crash moves with the jacket unit 4 and through cooperation with the support unit 1 absorbs energy. The switching piece 33, which preferably would again be affixed on the absorption element, could in this case in its active position also cooperate with an engagement region of the support unit 1.

By securing the switching unit 32 on the absorption element 26, 26', a preassembly becomes feasible before these parts are installed in the steering column. Hereby assembly is facilitated. A function test can also be carried out outside of the steering column.

The intermediate unit 40, provided between the support unit 1 and the jacket unit 4 in the depicted embodiment examples, could also be omitted. The side jaws 8, 9 of the support unit could in this case, in the closed state of the clamping mechanism 5, be pressed on both sides directly on the jacket unit 4. The swivel axle between the jacket unit 4 and the support unit 1 could in this case, for example, also be formed by a universal joint via which two sections of the steering spindle 2 are connected. This swivel axle could, furthermore, be formed by a swivel bolt affixed on the support unit 1, which bolt penetrates an elongated hole in the jacket unit 4 extending in the longitudinal direction 6.

The invention can also be employed in steering columns which are only adjustable in the longitudinal direction 6. The clamp bolt 12 could in this case penetrate openings 10, 11 developed in the form of round holes in the side jaws 8, 9 of support unit 1.

The sections of side jaws 15, 16 of jacket unit 4 comprising the openings 13, 14 and projecting upwardly could also be omitted such that the clamp bolt 12 does not penetrate any openings 13, 14 in the jacket unit 4.

Instead of a pyrotechnical switching unit 32, a switching unit activatable in another manner could also be provided, for example an electromagnetic, magnetic, electric, pneumatic or hydraulic switching unit.

The two parts, which in the event of a crash are dislocatable relative to one another in the displacement direction 21 and between which an absorption element 26, 26' acts for the absorption of energy in the event of a crash, are formed in the embodiments depicted in the Figures by the support unit 1 and the jacket unit 4 rotatably supporting the steering spindle 2. The invention can also be employed in connection with other parts, dislocatable relative to one another in the event of a crash, of a steering column, of which parts in the event of a vehicle crash one is held against a shift relative to the vehicle chassis and the other in comparison is shiftable in a displacement direction which preferably is parallel to the axis of the steering spindle in the section of the steering spindle adjoining the steering wheel-side end. It could, for example, be provided to develop the support unit 1 as a carriage which, in the event of a crash, is dislocatable in the displacement direction 21 relative to a chassis unit to be secured on the vehicle chassis, wherein between these two parts at least one absorption element is provided. This can, for example, be formed by a bending strip or a tearing-bending strip.

Although securement of the switching unit 32 on the absorption element 26, 26' is preferred, it would also be conceivable and feasible to affix the switching unit 32 on one of the two parts of the steering column that are dislocatable relative to one another in the event of a crash. Thus, for example (if the two parts dislocatable relative to one another in the event of a crash are the support unit 1 and the jacket unit 4) the switching unit 32 can be affixed on the jacket unit 4 or on the support unit 1 or (if the two parts dislocatable relative to one another in the event of a crash are a support unit and a chassis unit) on the support unit or on the chassis unit.

Between the two parts dislocatable in the event of a crash in the displacement direction or longitudinal direction more than one absorption element for consuming energy during the displacement could also be provided.

More than one switching unit 32 could also be provided in order to vary the extent of the energy absorption during the displacement of the two parts in the described manner, whereby more than two levels for the energy absorption can be provided.

Several energy absorption elements, of which one or several are each equipped with one or several switching units, can also be provided. It is also conceivable and feasible to develop several energy absorption elements unitarily one next to the other, for example as a sheet metal punched bending part.

Even if the engagement elements of the absorption elements cooperating with the holding part are depicted in the Figures as cutouts, it is also conceivable and feasible to provide engagement elements in the form of projections with which the holding element cooperates.

LEGEND TO THE REFERENCE NUMBERS

1 Support unit
2 Steering spindle
3 Steering wheel-side end
4 Jacket unit
5 Clamping mechanism
6 Longitudinal direction
7 Direction
8 Side jaw
9 Side jaw
10 Opening
11 Opening
12 Clamp bolt
13 Opening
24 Spring element
15 Side jaw 16 Side jaw
17 Press-on part
18 Actuating lever
19 Counter disk
20 Cam disk
21 Displacement direction
22 Recurvature
23 Holding part
14 Spring element
24a Section
24b Section
24c Bow section
25 Groove
26, 26' Absorption element
27 First section
28 Second section
29 Engagement element
30 Swivel axle
31 Nose
32 Switching unit
33 Switching piece
34 Housing
35 Securement flange
36 Securement flange
37 Opening
38 Opening
39 Engagement region
40 Intermediate unit
41 Side jaw
42 Side jaw
43 Longitudinal groove
44 Holding yoke
45 Bolt
46, 46' Elongated hole
47 Electric connection terminal
48 Welding seam

The invention claimed is:

1. A steering column for a motor vehicle, comprising:
a jacket unit which rotatably supports a section of a steering spindle adjoining a steering wheel-side end of the steering spindle;
a support unit securable on a chassis of the vehicle, by which the jacket unit is supported;
a clamping mechanism having an opened state in which a position of the jacket unit can be adjusted at least in a longitudinal direction of the steering column relative to the support unit so as to permit a length adjustment of the steering column, and a closed state in which the position of the jacket unit is secured, wherein in the event of a vehicle crash the jacket unit is displaceable relative to the support unit in a displacement direction which is parallel to the longitudinal direction of the steering column;
at least one absorption element arranged to act between the jacket unit and the support unit so as to absorb energy during the displacement of the jacket unit relative to the support unit in the event of the vehicle crash; and
at least one switching unit which comprises a housing, an actuator arranged in the housing, and a switching piece, the switching piece being switchable by the actuator between a passive and an active switched position, wherein in the active switched position of the switching piece, the switching piece engages an engagement region of one of the absorption element, the jacket unit and the support unit so as to effect an additional energy absorption during the displacement of the jacket unit relative to the support unit in the event of the vehicle crash by an energy-absorbing displacement between the switching piece and at least one section of the absorption element in the engagement region of the absorption element, or between the switching piece and the jacket unit in the engagement region of the jacket unit, or between the switching piece and the support unit in the engagement region of the support unit, such that a magnitude of the energy absorbed during the displacement of the jacket unit relative to the support unit in the event of the vehicle crash is greater in the active switched position than in the passive switched position of the switching piece,
wherein the housing of the switching unit is secured in position on the absorption element itself in the active as well as in the passive switched position of the switching piece,
wherein during the displacement of the jacket unit relative to the support unit in the event of the vehicle crash, a first section of the absorption element is held nondisplaceably relative to one of the jacket unit and the support unit, and a second section of the absorption element is held nondisplaceably relative to the other of the jacket unit and the support unit,
and wherein in the active switched position, the switching piece projects through an opening in the second section and engages the first section.

2. The steering column as claimed in claim 1, wherein the switching piece in its active switched position engages into an opening in the engagement region, wherein the switching piece during the displacement of the jacket unit relative to the support unit in the event of the vehicle crash widens the opening regionally or enlarges the opening by tearing open material in the engagement region.

3. The steering column as claimed in claim 1, wherein the first and second sections of the absorption element are formed by a first leg and a second leg, respectively, which are connected with one another via a recurvature of the absorption element.

4. The steering column as claimed in claim 3, wherein the first and second legs extend parallel to one another, and broad sides of the first and second legs are located one above the other.

5. The steering column as claimed in claim 1, wherein the switching unit is a pyrotechnically activatable switch.

6. The steering column as claimed in claim 1, wherein the support unit includes side jaws, the jacket unit being disposed between the side jaws,
wherein the clamping mechanism comprises a clamp bolt which penetrates openings in the side jaws of the support unit such that the clamp bolt is turned about its axis during opening and closing of the clamping mechanism,
and wherein at least one holding part is arranged between the side jaws of the support unit so as to be displaced through the turning of the clamp bolt during the opening and closing of the clamping mechanism, such that the at least one holding part engages on the absorption element in the closed state of the clamping mechanism and is spaced apart from the absorption element in the opened state of the clamping mechanism.

7. The steering column as claimed in claim 6, wherein the absorption element comprises a multiplicity of engagement elements disposed sequentially in the longitudinal direction of the steering column.

8. The steering column as claimed in claim 1, wherein in the active switched position, the switching piece is stayed by a margin of the opening in the second section during an energy-absorbing displacement in the engagement region of the first section of the absorption element.

9. The steering column as claimed in claim 7, wherein the engagement elements are formed by cutouts into which a projecting nose of the at least one holding part can be introduced so as to form a form-closure engagement acting in the longitudinal direction of the steering column.

10. A steering column for a motor vehicle, comprising:
a jacket unit which rotatably supports a section of a steering spindle adjoining a steering wheel-side end of the steering spindle;
a support unit securable on a chassis of the vehicle, by which the jacket unit is supported;
a clamping mechanism having an opened state in which a position of the jacket unit can be adjusted at least in a longitudinal direction of the steering column relative to the support unit so as to permit a length adjustment of the steering column, and a closed state in which the position of the jacket unit is secured, wherein in the event of a vehicle crash the jacket unit is displaceable relative to the support unit in a displacement direction which is parallel to the longitudinal direction of the steering column;
at least one absorption element arranged to act between the jacket unit and the support unit so as to absorb energy during the displacement of the jacket unit relative to the support unit in the event of the vehicle crash; and
at least one switching unit which comprises a housing, an actuator arranged in the housing, and a switching piece, the switching piece being switchable by the actuator between a passive and an active switched position, wherein in the active switched position of the switching piece, the switching piece engages an engagement region of one of the absorption element, the jacket unit and the support unit so as to effect an additional energy absorption during the displacement of the jacket unit relative to the support unit in the event of the vehicle crash by an energy-absorbing displacement between the switching piece and at least one section of the absorption element in the engagement region of the absorption element, or between the switching piece and the jacket unit in the engagement region of the jacket unit, or between the switching piece and the support unit in the engagement region of the support unit, such that a magnitude of the energy absorbed during the displacement of the jacket unit relative to the support unit in the event of the vehicle crash is greater in the active switched position than in the passive switched position of the switching piece,
wherein during the displacement of the jacket unit relative to the support unit in the event of the vehicle crash, a first leg of the absorption element is held nondisplaceably relative to one of the jacket unit and the support unit, and a second leg of the absorption element is held nondisplaceably relative to the other of the jacket unit and the support unit,
wherein the first and second legs of the absorption element are connected with one another via a recurvature of the absorption element,
wherein in the active switched position, the switching piece projects through an opening in the second leg of the absorption element and engages the first leg of the absorption element,
and wherein the housing of the switching unit is secured in position on the second leg of the absorption element.

* * * * *